US012805654B2

(12) United States Patent
Kobayashi et al.

(10) Patent No.: US 12,805,654 B2

(45) **Date of Patent: *Nov. 24, 2026**

(54) IMAGE DISPLAY DEVICE, IMAGE DISPLAY SYSTEM, IMAGE DISPLAY METHOD, AND PROGRAM

(71) Applicant: NEC Corporation, Tokyo (JP)

(72) Inventors: Jun Kobayashi, Tokyo (JP); Shigetsu Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/066,315

(22) Filed: Feb. 28, 2025

(65) Prior Publication Data

US 2025/0194824 A1 Jun. 19, 2025

Related U.S. Application Data

(63) Continuation of application No. 18/237,245, filed on Aug. 23, 2023, now Pat. No. 12,268,313, which is a (Continued)

(30) Foreign Application Priority Data

Mar. 22, 2016 (JP) ................................ 2016-057537

(51) Int. Cl.

*G06Q 30/06* (2023.01)

*A47F 3/00* (2006.01)

(Continued)

(52) U.S. Cl.

CPC ........... *A47F 5/0807* (2013.01); *G06Q 30/02* (2013.01); *G06Q 30/06* (2013.01); *G06V 20/52* (2022.01);

(Continued)

(58) Field of Classification Search

CPC ......... A47F 5/0807; A47F 3/00; G06V 20/52; G06V 40/103; G06Q 30/02; G06Q 30/06; G09G 3/20; G09G 2354/00

See application file for complete search history.

(56) References Cited

U.S. PATENT DOCUMENTS

| | | | | |
|---|---|---|---|---|
| 6,283,377 | B1 | 9/2001 | Takuma | |
| 8,219,438 | B1 * | 7/2012 | Moon | G06Q 30/0204 705/7.29 |

(Continued)

FOREIGN PATENT DOCUMENTS

| | | |
|---|---|---|
| JP | 2007-114851 A | 5/2007 |
| JP | 2009-048430 A | 3/2009 |

(Continued)

OTHER PUBLICATIONS

Communication dated Dec. 18, 2018 issued by the Japanese Patent Office in counterpart application No. 2018-507208.

(Continued)

*Primary Examiner* — Thai Q Tran

*Assistant Examiner* — Jose M Mesa

(74) *Attorney, Agent, or Firm* — Sughrue Mion, PLLC

(57) ABSTRACT

An image display device includes an approach situation information acquirer that acquires approach situation information indicating approach of at least part of a customer's body to a shelf on which a plurality of items are displayed and indicating, when there is the approach, a position of the approach on the shelf at each time; an associator that associates the approach situation information with one item of the plurality of items according to the position indicated by the approach situation information; an index value calculator that calculates an index value relating to the customer's behavior on the basis of information indicating the item associated with the approach situation information; and a display unit that displays the index value calculated by the (Continued)

index value calculator together with an image of the item on the basis of the association made by the associator.

17 Claims, 9 Drawing Sheets

Related U.S. Application Data continuation of application No. 17/325,824, filed on May 20, 2021, now Pat. No. 11,786,058, which is a continuation of application No. 16/854,458, filed on Apr. 21, 2020, now Pat. No. 11,051,638, which is a continuation of application No. 16/085,638, filed as application No. PCT/JP2017/009533 on Mar. 9, 2017, now Pat. No. 10,813,477.

(51) Int. Cl.

| | |
|---|---|
| ***A47F 5/08*** | (2006.01) |
| ***G06Q 30/02*** | (2023.01) |
| ***G06V 20/52*** | (2022.01) |
| ***G06V 40/10*** | (2022.01) |
| ***G09G 3/20*** | (2006.01) |

(52) U.S. Cl.

CPC .............. *G06V 40/103* (2022.01); *A47F 3/00* (2013.01); *G09G 3/20* (2013.01); *G09G 2354/00* (2013.01)

(56) References Cited

U.S. PATENT DOCUMENTS

| | | | | |
|---|---|---|---|---|
| 8,380,558 | B1 | 2/2013 | Sharma et al. | |
| 8,873,794 | B2 | 10/2014 | Sorensen et al. | |
| 10,133,933 | B1 | 11/2018 | Fisher | |
| 10,387,897 | B2 | 8/2019 | Sakata et al. | |
| 11,851,279 | B1 | 12/2023 | Chinoy et al. | |
| 2002/0184082 | A1 | 12/2002 | Nakano | |
| 2009/0153328 | A1 | 6/2009 | Otani et al. | |
| 2014/0132728 | A1 | 5/2014 | Verano et al. | |
| 2014/0214547 | A1 | 7/2014 | Signorelli | |
| 2014/0257990 | A1 | 9/2014 | Cudgma et al. | |
| 2015/0193716 | A1 | 7/2015 | Tanigawa et al. | |
| 2015/0206188 | A1 | 7/2015 | Tanigawa | |
| 2015/0242863 | A1 | 8/2015 | Sato et al. | |
| 2016/0055566 | A1 | 2/2016 | Otani | |
| 2016/0063712 | A1 | 3/2016 | Matsumoto | |
| 2017/0255947 | A1 | 9/2017 | Horikawa | G06V 40/20 |
| 2021/0304256 | A1 | 9/2021 | Ishida et al. | |

FOREIGN PATENT DOCUMENTS

| | | | |
|---|---|---|---|
| JP | 2008-151409 | A | 7/2009 |
| JP | 4972491 | B2 | 7/2012 |
| JP | 2014-026350 | A | 2/2014 |
| JP | 2014-106628 | A | 6/2014 |
| JP | 2016-011649 | A | 1/2015 |
| JP | 2015-149064 | A | 8/2015 |
| JP | 2015-179390 | A | 10/2015 |
| JP | 5866564 | B1 | 2/2016 |
| JP | 5881022 | B1 | 3/2016 |
| WO | 2010/083194 | A1 | 8/2010 |
| WO | 2014/010143 | A1 | 1/2014 |
| WO | 2014/045816 | A1 | 3/2014 |
| WO | 2015/040661 | A1 | 3/2015 |

OTHER PUBLICATIONS

International Search Report of PCT/JP2017/009533 dated Apr. 18, 2017 [PCT/ISA/2010].
Communication dated Jan. 23, 2020, from the United States Patent and Trademark Office in U.S. Appl. No. 16/085,638.
Josh Constine, “Shopper Tracker’s Kinect Hack is Like Google Analytics For Retail Store Shelves”, TechCrunch, Dec. 5, 2011, Retrieved from the internet: URL:https://techcrunch.com/2011/12/05/shopper-tracker-kinect/, (2 pages total).
JP Office Action for JP Application No. 2021-112372, mailed on Aug. 2, 2022 with English Translation.
US Office Action for U.S. Appl. No. 17/325,824 mailed on Oct. 13, 2022.
US Office Action for U.S. Appl. No. 17/325,824 mailed on Feb. 24, 2023.
US Notice of Allowance for U.S. Appl. No. 18/204,145, mailed on Mar. 8, 2024.
US Office Action for U.S. Appl. No. 18/237,240, mailed on Apr. 12, 2024.
JP Office Action for JP Application No. 2024-046806 , mailed on Oct. 1, 2024 with English Translation.
JP Office Communication for JP Application No. 2024-046806, mailed on Jan. 21, 2025 with English Translation.
US Office Action for U.S. Appl. No. 19/221,690, mailed on Aug. 19, 2026.
US Office Action for U.S. Appl. No. 19/221,950, mailed on Aug. 26, 2026.

* cited by examiner

FIG. 6

| GROUP NUMBER | SENSING TIME | ITEM IDENTIFICATION INFORMATION |
|---|---|---|
| ⋮ | ⋮ | ⋮ |

IMAGE DISPLAY DEVICE, IMAGE DISPLAY SYSTEM, IMAGE DISPLAY METHOD, AND PROGRAM

CROSS REFERENCE TO RELATED APPLICATIONS

This application is a continuation of U.S. application Ser. No. 18/237,245, filed Aug. 23, 2023, which is a continuation of U.S. application Ser. No. 17/325,824, filed May 20, 2021, which issued as U.S. Pat. No. 11,786,058, which is a continuation of U.S. application Ser. No. 16/854,458, filed Apr. 21, 2020, which issued as U.S. Pat. No. 11,051,638, which is a continuation of U.S. application Ser. No. 16/085,638, filed Sep. 17, 2018, which issued as U.S. Pat. No. 10,813,477, which is a National Stage of International Application No. PCT/JP2017/009533, filed Mar. 9, 2017, claiming priority based on Japanese Patent Application No. 2016-057537, filed Mar. 22, 2016, the contents of all of which are incorporated herein by reference in their entirety.

TECHNICAL FIELD

The present invention relates to an image display device, an image display system, an image display method, and a program.

BACKGROUND ART

In some cases, customers' behavior in shops is analyzed for the purpose of determining the purchasing habits of customers or the like. For example, Patent Document 1 describes that a period of time during which a customer stays in a surrounding area and the number of times of item pickup in each display shelf are measured/counted and displayed.

CITATION LIST

Patent Literature

[Patent Document 1]

Japanese Unexamined Patent Application, First Publication No. 2015-11649

SUMMARY OF INVENTION

Technical Problem

From the viewpoint of performing more sophisticated analysis of customers' behavior, it is desirable that display be performed in more detail than in the case of measuring/counting and displaying the period of time during which a customer stays in a surrounding area and the number of times of item pickup in each display shelf.

An object of the present invention is to provide an image display device, an image display system, an image display method, and a program that can solve the above problems.

Solution to Problem

According to a first aspect of the present invention, an image display device includes an approach situation information acquirer configured to acquire approach situation information indicating approach of at least part of a customer's body to a shelf on which a plurality of items are displayed and indicating, when there is the approach, a position of the approach on the shelf at each time; an associator configured to associate the approach situation information with one item of the plurality of items according to the position indicated by the approach situation information; an index value calculator configured to calculate an index value relating to the customer's behavior on the basis of information indicating the one item associated with the approach situation information; and a display unit configured to display the index value calculated by the index value calculator together with an image of the item on the basis of an association made by the associator.

According to a second aspect of the present invention, an image display system includes a shelf-front behavior measurement sensor configured to detect approach of at least part of a customer's body to a shelf on which a plurality of items are displayed and to generate sensing data indicating a position on the shelf at which the approach has been detected; an approach situation information acquirer configured to generate, on the basis of the sensing data, approach situation information indicating whether or not there is the approach and indicating, when there is the approach, the position on the shelf at each time; an associator configured to associate the approach situation information with one item of the plurality of items according to the position indicated by the approach situation information; an index value calculator configured to calculate an index value relating to the customer's behavior on the basis of information indicating the one item associated with the approach situation information; and a display unit configured to display the index value calculated by the index value calculator together with an image of the item on the basis of an association made by the associator.

According to a third aspect of the present invention, an image display method includes an approach situation information acquisition step to acquire approach situation information indicating approach of at least part of a customer's body to a shelf on which a plurality of items are displayed and indicating, when there is the approach, a position of the approach on the shelf at each time; an association step to associate the approach situation information with one item of the plurality of items according to the position indicated by the approach situation information; an index value calculation step to calculate an index value relating to the customer's behavior on the basis of information indicating the one item associated with the approach situation information; and a display step to display the index value calculated in the index value calculation step together with an image of the item on the basis of the association made by the association step.

According to a fourth aspect of the present invention, a program causes a computer to execute an approach situation information acquisition step to acquire approach situation information indicating approach of at least part of a customer's body to a shelf on which a plurality of items are displayed and indicating, when there is the approach, a position of the approach on the shelf at each time; an association step to associate the approach situation information with one item of the plurality of items according to the position indicated by the approach situation information; an index value calculation step to calculate an index value relating to the customer's behavior on the basis of information indicating the one item associated with the approach situation information; and a display step to display the index value calculated in the index value calculation step together with an image of the item on the basis of the association made by the association step.

Advantageous Effects of Invention

According to the present invention, it is possible to display information indicating a customer's behavior in more detail.

BRIEF DESCRIPTION OF DRAWINGS

FIG. 6 is an explanatory diagram showing an exemplary data structure of information stored in a storage unit according to the embodiment in which a sensing time and item identification information are associated with each other.

DESCRIPTION OF EMBODIMENTS

Hereinafter, embodiments of the present invention will be described. However, the following embodiments do not limit the invention according to the claims. In addition, not all combinations of the features described in the embodiments are necessarily essential to the solution of the invention.

Figure 1:
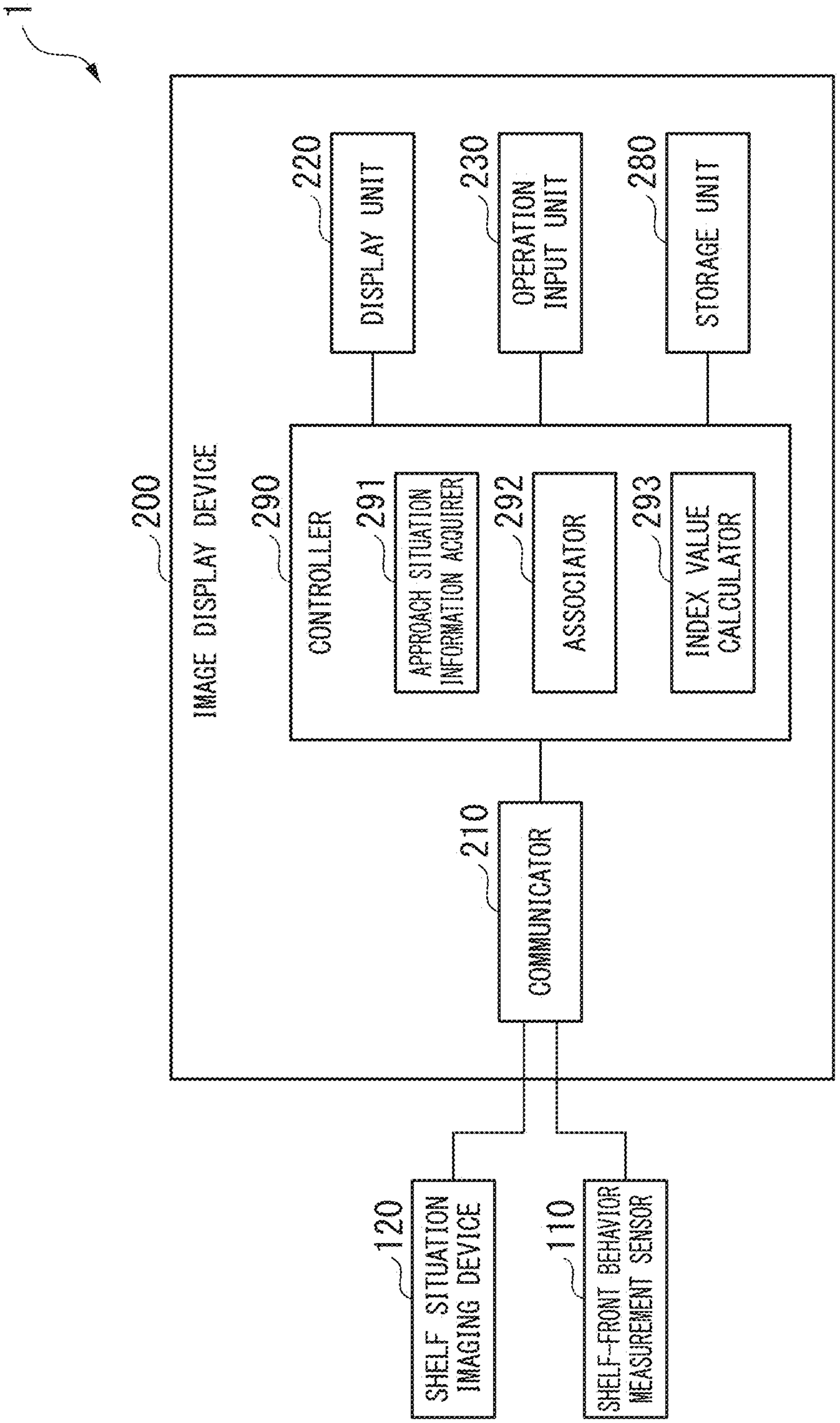
FIG. 1 is a schematic block diagram showing a functional configuration of an image display system according to an embodiment of the present invention.

FIG. 1 is a schematic block diagram showing a functional configuration of an image display system according to an embodiment of the present invention. As shown in FIG. 1, the image display system 1 includes a shelf-front behavior measurement sensor 110, a shelf situation imaging device 120 and an image display device 200. The image display device 200 includes a communicator 210, a display unit 220, an operation input unit 230, a storage unit 280 and a controller 290. The controller 290 includes an approach situation information acquirer 291, an associator 292 and an index value calculator 293.

The image display system 1 analyzes a customer's shelf-front behavior and displays the analysis result such that the analysis result is superimposed on an image of shelves. The shelf-front referred to here is the front of an item display shelves (in particular, the vicinity of the front face of the item display shelves), and the shelf-front behavior referred to here is a behavior performed by the customer in front of the item display shelves. Hereinafter, the item display shelf is simply referred to as a shelf.

The shelf-front behavior measurement sensor 110 is a sensor provided to detect shelf-front behaviors. For example, a distance sensor installed in a direction from the upper side to the lower side of the front face of the shelves can be used as the shelf-front behavior measurement sensor 110. When a customer extends their hand to the shelves, the shelf-front behavior measurement sensor 110 detects horizontal and vertical positions of the customer's hand in front of the shelves, thereby allowing the image display device 200 to estimate an item to which the customer has extended their hand.

The shelf situation imaging device 120 includes a camera that is provided in front of the shelves to capture a moving image or a still image, and images the state of the front of the shelves and the state of the shelves continuously or at predetermined time intervals.

Using the image captured by the shelf situation imaging device 120, the image display device 200 can detect a period from when the customer stops in front of the shelves to when leaving the shelves. As a result, the image display device 200 can detect hand extension that the customer performs for the shelves from when the customer stops in front of the shelves to when leaving the shelves as a series of hand extensions of the same customer.

Further, by comparing images before and after the customer extends their hand to the shelves, the image display device 200 can detect that the customer has picked up an item and that the customer has returned the item picked up by the customer to the shelves.

Here, an exemplary arrangement of the shelf-front behavior measurement sensor 110 and the shelf situation imaging device 120 will be described with reference to FIGS. 2 and 3.

Figure 2:
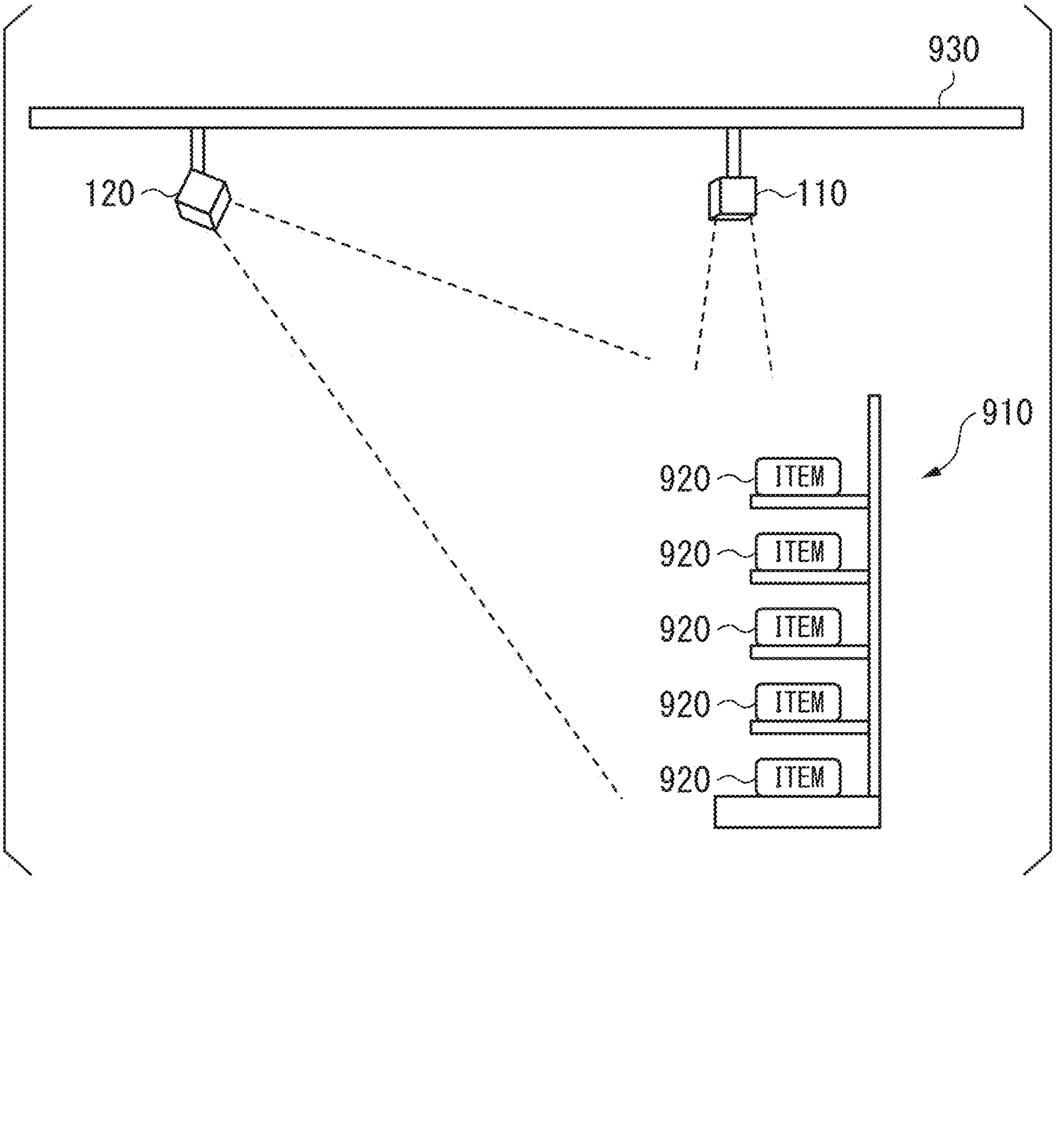
FIG. 2 is an explanatory diagram showing an exemplary arrangement of a shelf-front behavior measurement sensor and a shelf situation imaging device when shelves are viewed from the side in the embodiment.

FIG. 2 is an explanatory diagram showing an exemplary arrangement of the shelf-front behavior measurement sensor 110 and the shelf situation imaging device 120 when the shelf is viewed from the side thereof. In the example shown in FIG. 2, the shelf-front behavior measurement sensor 110 is installed downward from a ceiling 930 above the front face of the shelves 910. The shelves 910 has a plurality of layers and the items 920 are placed on each of the layers. When the customer extends their hand to the shelves 910, the shelf-front behavior measurement sensor 110 measures the distance between the shelf-front behavior measurement sensor 110 and the hand. Using the measured distance, the image display device 200 can determine which layer of the shelves 910 the customer has extended their hand to.

The camera of the shelf situation imaging device 120 is installed at a position and orientation for imaging the shelves 910 from the ceiling 930 in front of the shelves 910. For example, the shelf situation imaging device 120 includes one camera, and the camera is installed at a position and orientation at which it is possible to image the entire front face of the shelves 910. Alternatively, the shelf situation imaging device 120 may include a plurality of cameras when the entire front face of the shelves 910 cannot be imaged by one camera.

Figure 3:
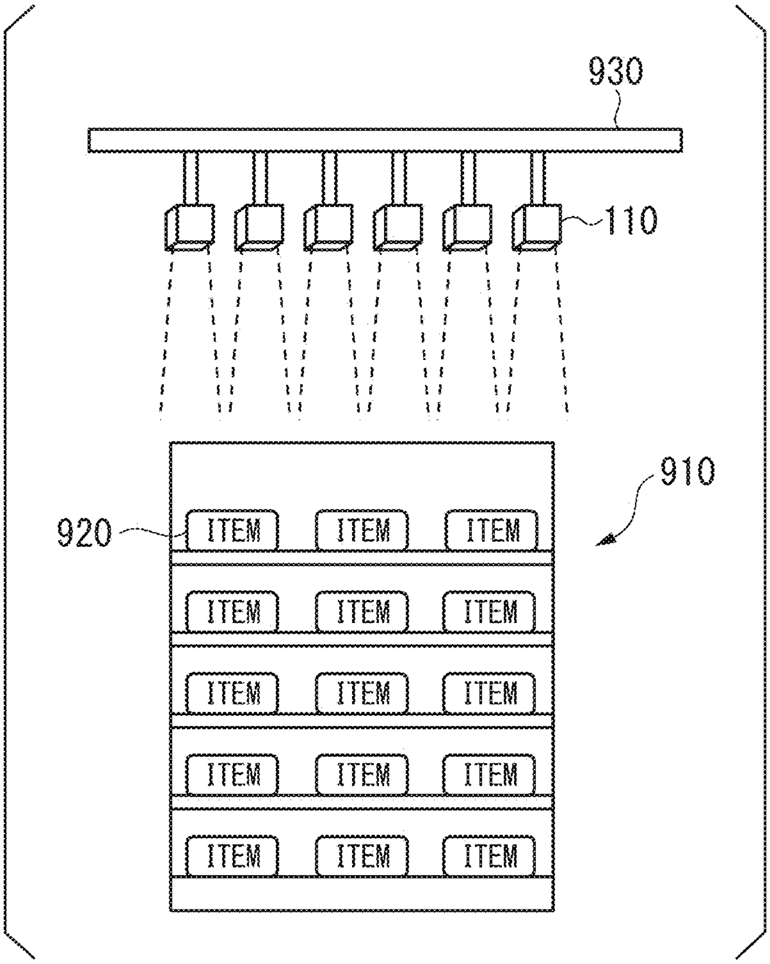
FIG. 3 is an explanatory diagram showing an exemplary arrangement of shelf-front behavior measurement sensors when the shelves are viewed from the front in the embodiment.

FIG. 3 is an explanatory diagram showing an exemplary arrangement of shelf-front behavior measurement sensors 110 when the shelf is viewed from the front. In the example of FIG. 3, a plurality of shelf-front behavior measurement sensors 110 are arranged on the ceiling 930 along the width direction of the shelves 910. When a customer extends their hand to the shelves 910, the image display device 200 can determine the position of the hand in the horizontal direction of the shelves 910 by identifying a shelf-front behavior measurement sensor 110 that has detected the hand.

Here, the shelf-front behavior measurement sensors 110 only need to be able to detect the position of the hand in the vertical direction of the shelves 910 and the position of the hand in the horizontal direction of the shelves 910 when the customer extends their hand to the shelves 910. For example, as the shelf-front behavior measurement sensors 110, one set of three-dimensional cameras may be installed above the front face of the shelves 910 to image the front face of the shelves in the vertical direction.

The installation position of the shelf-front behavior measurement sensors 110 is not limited to above the shelves 910. For example, the shelf-front behavior measurement sensor 110 may be installed on the side of the shelves 910 to sense the front side of the shelves 910 sideways.

The image display device 200 analyzes a shelf-front behavior on the basis of sensing data from the shelf-front behavior measurement sensor(s) 110.

Specifically, as described with reference to FIGS. 2 and 3, when the customer extends their hand to the shelves 910, the image display device 200 detects the position of the hand in the vertical direction of the shelves 910 and the position of the hand in the horizontal direction of the shelves 910 on the basis of the sensing data from the shelf-front behavior measurement sensor 110. The image display device 200 stores the arrangement of the items 920 on the shelves 910 in advance and estimates an item to which the customer has extended the hand on the basis of the position of the hand of the customer. For example, for each item, the image display device 200 counts the number of times that customers have extended their hands to the item and displays the count result (for example, a total count for all customers within a predetermined period) such that the count result is superimposed on the image of the shelves 910.

The image display device 200 is configured, for example, using a computer.

The communicator 210 communicates with other devices. The communicator 210 receives sensing data from the shelf-front behavior measurement sensor 110. The communicator 210 also receives the image captured by the shelf situation imaging device 120 as image data.

For example, the display unit 220 has a display screen such as a liquid crystal panel or a light emitting diode (LED) panel and displays various images under the control of the controller 290. The display unit 220 displays a customer behavior index value such as the count result of the number of times that customers have extended their hands to each item such that the customer behavior index value is superimposed on the image of the shelves 910. The customer behavior index value referred to here is an index value that the index value calculator 293 calculates with regard to customers' behavior.

Figure 4:
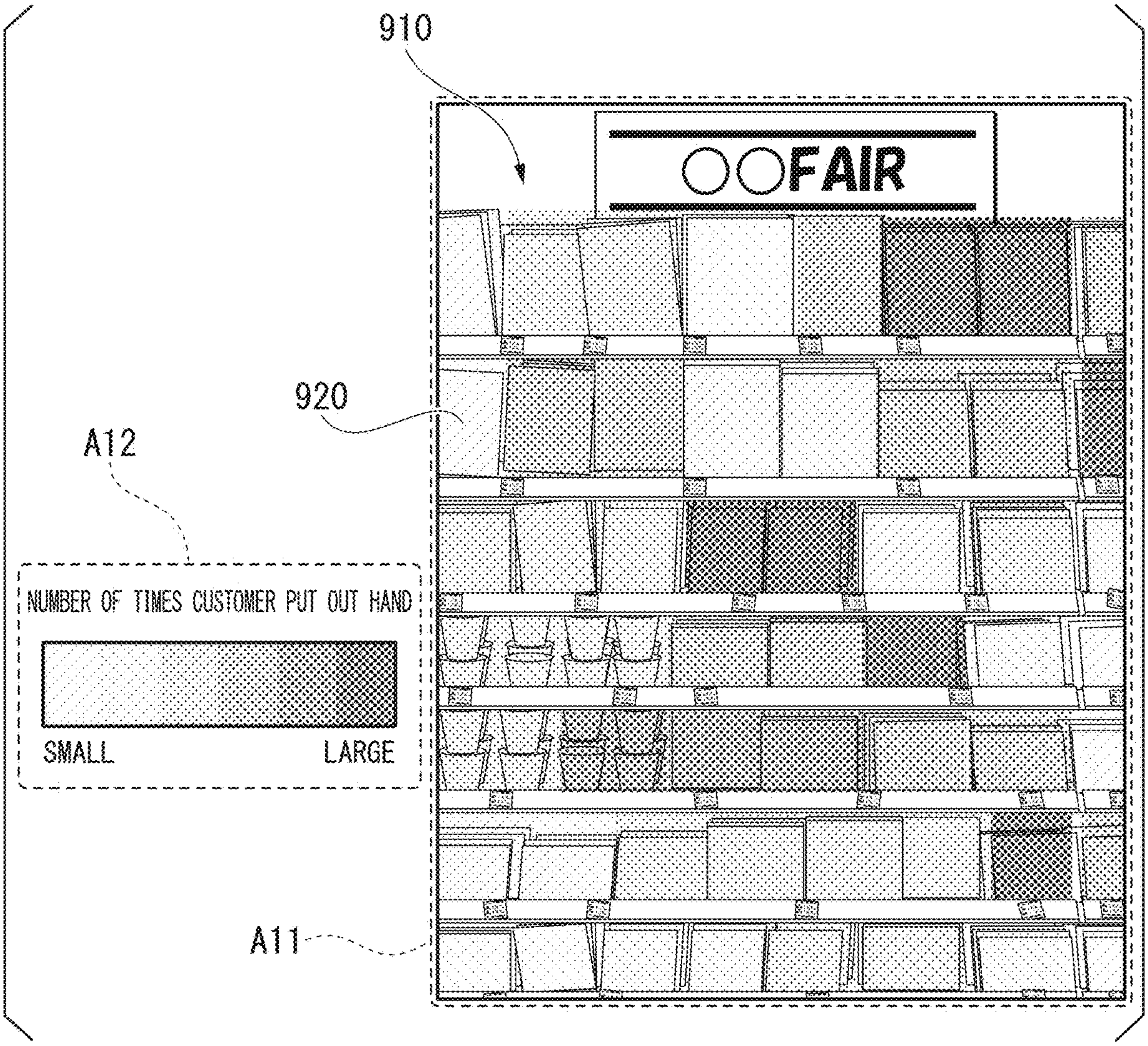
FIG. 4 is an explanatory diagram showing an example of display of a customer behavior index value by a display unit according to the embodiment.

FIG. 4 is an explanatory diagram showing an example of display of the customer behavior index value by the display unit 220. In the example shown in FIG. 4, the display unit 220 displays an image of shelves 910 in which items 920 are arranged in an area A11. The display unit 220 displays images of the items in colors according to the number of times that customers have extended their hands to each of the items. The display unit 220 displays a legend indicating the association between the number of times that customers have extended their hands to each item and the color in the area A12. The display unit 220 shows the number of times that customers have extended their hands to each item in a heat map format. The heat map referred to here is a display method in which the value of each element of a matrix is indicated by a color.

The number of times that customers have extended their hands to each item corresponds to an example of the customer behavior index value. The display unit 220 displays the customer behavior index value at the position of the image of each item 920 in the image of the shelves 910 with a color added to the image of the item. In this respect, the display unit 220 displays the customer behavior index value together with the image of the item.

However, the method in which the display unit 220 displays the customer behavior index value is not limited to the method of adding a color to the image of each item. For example, the display unit 220 may display a customer behavior index value by adding a predetermined pattern such as that of stripes or dots, instead of a color, to the image of each item. The display unit 220 may also display a number indicating the customer behavior index value such that the number is superimposed on the image of each item.

The display unit 220 also displays an index value, which indicates a correlation between a behavior the customer has performed for an item designated by a user of the image display system 1 and a behavior that the same customer has performed for an item other than the designated item, at the position of an image of the item 920 in the image of the shelves 910. In the following, the user of the image display system 1 is simply referred to as a user.

Figure 5:
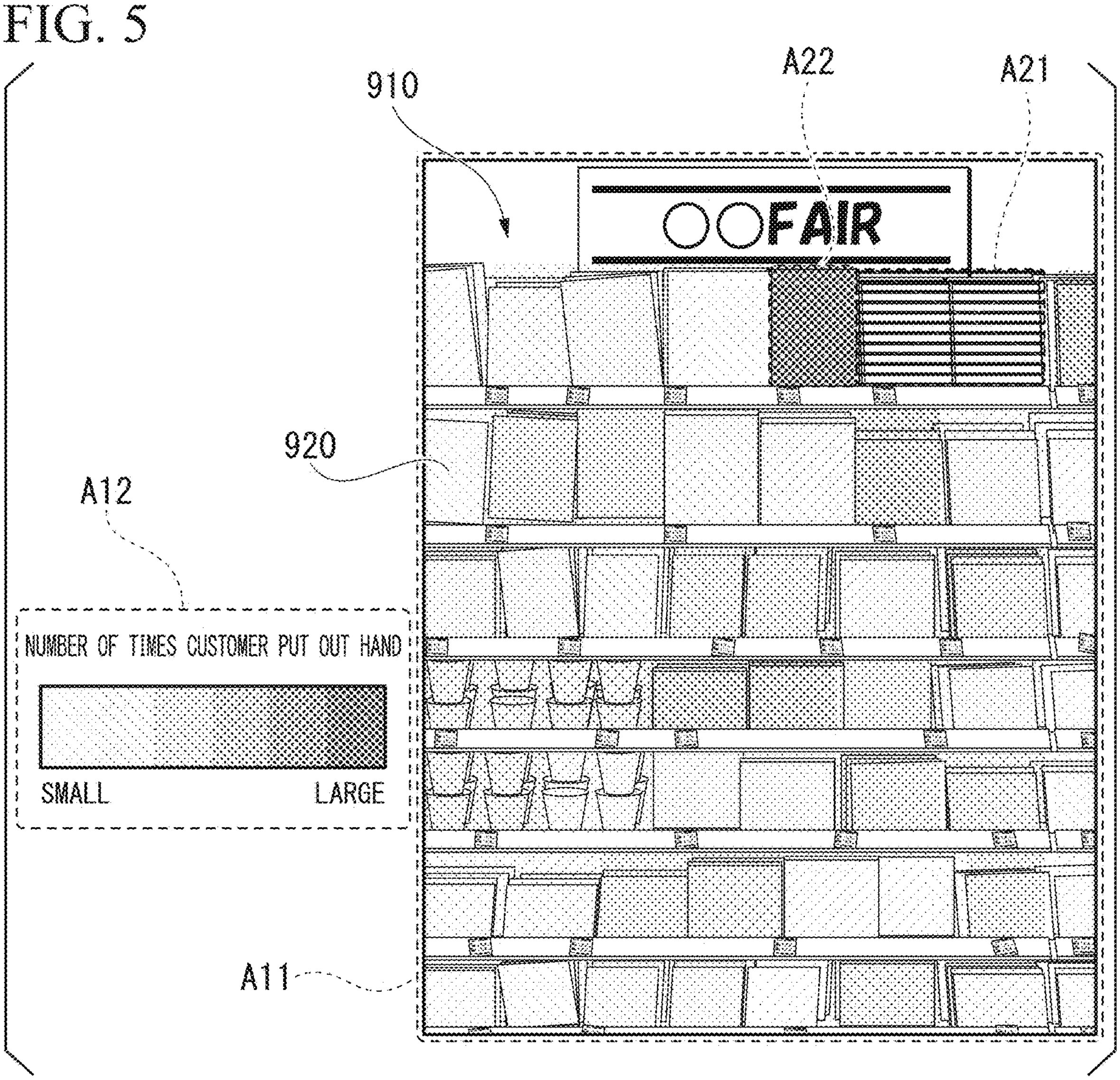
FIG. 5 is an explanatory diagram showing an example of display, by the display unit, of a customer behavior index value indicating a correlation between a behavior that a customer has performed for an item designated by a user of the image display system according to the embodiment and a behavior that the same customer has performed for an item other than the designated item.

FIG. 5 is an explanatory diagram showing an example of display, by the display unit 220, of a customer behavior index value indicating a correlation between a behavior that a customer has performed for an item designated by the user of the image display system 1 and a behavior that the same customer has performed for an item other than the designated item on the display unit 220. In the example of FIG. 5, the display unit 220 displays an image of the shelves 910 in which items 920 are arranged in an area A11, similar to the example of FIG. 4. The display unit 220 also displays a legend indicating the association between the number of times that customers have extended their hands to each item and the color in an area A12.

In FIG. 5, the display unit 220 indicates items 920 designated (selected) by the user, unlike the case of FIG. 4. In the example of FIG. 5, the user designates items 920 shown in the area A21 and the display unit 220 indicates the designated items 920 by displaying stripes in the area A21. Hereinafter, the items 920 designated by the user are referred to as designated items.

In the example of FIG. 5, the display unit 220 displays the count result of the number of times that customers who extended their hands to the designated items (one or more times) have extended their hands to each item 920 other than the designated items (for example, a total count for all customers within a predetermined period) in a heat map format. Specifically, the display unit 220 displays an image of each item 920 other than the designated items in a color corresponding to the number of times that customers who extended their hands to the designated items (one or more times) have extended their hands to the item 920 other than the designated items. In the example of FIG. 5, customers who extended their hands to the items (designated items) displayed in the area A21 have extended their hands to an item displayed in an area A22 many times and therefore the display unit 220 displays an image of the item 920 in the area A22 in a color indicating that the number of times that the customers have extended their hands to the item is large.

For example, the operation input unit 230 includes input devices such as a keyboard and a mouse and receives user operations. The operation input unit 230 corresponds to an example of the item designation receiver and receives designation of an item. For example, the operation input unit 230 receives designation of an item 920 through a user operation of clicking the item 920 displayed on the display unit 220 with a mouse.

The storage unit 280 stores various types of information. The storage unit 280 stores sensing data obtained by the shelf-front behavior measurement sensor 110 or data that the controller 290 has obtained by processing the sensing data. For example, the storage unit 280 stores information that associates item identification information indicating an item 920 to which a customer has extended their hand with the time at which the shelf-front behavior measurement sensor 110 has detected the hand of the customer ("association information" which will be described later). Further, the storage unit 280 stores the information that associates the item identification information indicating the item 920 to which the customer has extended their hand with the time at which the shelf-front behavior measurement sensor 110 has detected the hand of the customer as information of a series of hand extensions of the same customer during a period from when the customer stops in front of the shelves to when leaving the shelves.

The item identification information referred to here is information identifying the item 920 placed on the shelves 910 for each of the items. In the present embodiment, items of the same specification (for example, items have the same name) are regarded as the same items. Predetermined information such as item names may be used as the item identification information or identification information dedicated to the image display system 1 may be defined.

FIG. 6 is an explanatory diagram showing an exemplary data structure of information in which a sensing time and item identification information stored in the storage unit 280 are associated with each other (association information which will be described later). As shown in FIG. 6, the storage unit 280 stores a group number, a sensing time, and item identification information in association with each other.

In the example of FIG. 6, the item identification information indicates the item 920, to which the customer has extended their hand, identified on the basis of the sensing data from the shelf-front behavior measurement sensor 110.

The sensing time indicates the time at which the shelf-front behavior measurement sensor 110 detected an object indicated in the sensing data. For example, the time at which the communicator 210 received the sensing data may be used as the sensing time.

The group number is used as information for combining a series of hand extensions detected from when the customer stops in front of the shelves to when leaving the shelves into one group. On the basis of an image captured by the shelf situation imaging device 120, the image display device 200 detects a period from when the customer stops in front of the shelves to when leaving the shelves and adds the same group number to information (a combination of the sensing time and the item identification information) which is based on the sensing data that the shelf-front behavior measurement sensor 110 transmitted during this period. This makes it possible to detect that one customer has extended their hand to the shelves 910 a plurality of times as shown in the example of FIG. 5.

However, the information stored in the storage unit 280 is not limited to that shown in the example of FIG. 6 in which the sensing time and the item identification information are associated with each other. For example, the storage unit 280 may store sensing data from the shelf-front behavior measurement sensor 110 and time information indicating the sensing time in association with each other. Alternatively, the storage unit 280 may store information, which is obtained by converting the sensing data from the shelf-front behavior measurement sensor 110 into positions in the vertical and horizontal directions of the shelves 910, in the form of coordinate values. Alternatively, the storage unit 280 may store information indicating, for each item 920, the number of times that the customer has extended their hand to the item.

The storage unit 280 stores images captured by the shelf situation imaging device 120 in time series in association with the captured times.

The storage unit 280 is realized using a storage device provided in the image display device 200. The storage device provided in the image display device 200 may be a storage device built into the image display device 200 or a storage device externally attached to the image display device 200.

The controller 290 controls each part of the image display device 200 to perform various processes. The controller 290 is realized, for example, by a central processing unit (CPU) provided in the image display device 200 reading and executing a program from the storage unit 280.

The approach situation information acquirer 291 acquires approach situation information. The approach situation information referred to here is information indicating whether or not at least part of the customer's body has approached the shelves 910 and indicating, when at least part thereof has approached the shelves 910, a corresponding position on the shelves 910 at each time.

Specifically, when the shelf-front behavior measurement sensor 110 has detected an object (in particular, a customer's hand), the approach situation information acquirer 291 converts the sensing data into coordinate values on the front face of the shelves 910.

For example, the storage unit 280 previously stores information which indicates, for each shelf-front behavior measurement sensor 110, a position in the horizontal direction of the shelves 910 at which the shelf-front behavior measurement sensor 110 detects an object. In accordance with a shelf-front behavior measurement sensor 110 that has detected an object, the approach situation information acquirer 291 reads information regarding the position at which the shelf-front behavior measurement sensor 110 detects the object from the storage unit 280.

The approach situation information acquirer 291 reads the distance between the object detected by the shelf-front behavior measurement sensor 110 and the shelf-front behavior measurement sensor 110 from the sensing data. The approach situation information acquirer 291 converts the read distance into a position in the vertical direction of the shelves 910.

The approach situation information acquirer 291 generates approach situation information by associating reception time information of the sensing data, which is time information indicating the sensing time, with the corresponding coordinate value. The presence of the approach situation information indicates that the shelf-front behavior measurement sensor 110 has detected the object.

When the shelf-front behavior measurement sensor 110 has detected an object, it is assumed that at least part of the customer's body (especially the customer's hand) has approached the shelves 910. In this respect, the approach situation information indicates whether or not at least part of the customer's body has approached the shelves 910 by presence or absence of the information. The approach situation information indicates whether or not at least part of the customer's body has approached the shelves 910 and indicates, when at least part thereof has approached the shelves 910, a corresponding position on the shelves 910 by coordinate values. The position indicated by the coordinates is a position on the shelves 910 at which at least part of the customer's body has approached the shelves 910.

The associator 292 associates the approach situation information generated by the approach situation information acquirer 291 with one of the items 920 according to the position indicated by the approach situation information. For example, the storage unit 280 previously stores information that associates position information that the approach situation information acquirer 291 detects from sensing data with one of the items 920. Further, for each item 920 placed on the shelves 910, the storage unit 280 previously stores the position of the item 920 on the shelves 910 as two-dimensional coordinate values in the horizontal and vertical directions of the shelves 910. The associator 292 reads the item 920 associated with the coordinate values indicated by the approach situation information generated by the approach situation information acquirer 291 from the storage unit 280, thereby associating the approach situation information with the item 920.

The associator 292 generates information in which item identification information identifying the associated item 920 and time information indicating the sensing time are associated with each other and stores the generated information in the storage unit 280. Hereinafter, the information generated by the associator 292, in which the item identification information and the time information indicating the sensing time are associated with each other is referred to as association information. The association information corresponds to an example of the information indicating the item associated with the approach situation information.

The index value calculator 293 calculates a customer behavior index value on the basis of the association information generated by the associator 292. For example, for each item 920, the index value calculator 293 counts the number of times that customers have extended their hands to the item 920 within a predetermined period and calculates a customer behavior index value indicating the count result as in the example of FIG. 4.

Further, the index value calculator 293 calculates a customer behavior index value indicating a correlation between a behavior that a customer has performed for a designated item and a behavior that the same customer has performed for an item other than the designated item. For example, as in the example of FIG. 5, for each item 920 other than the designated items, the index value calculator 293 calculates a customer behavior index value indicating the number of times that customers who extended their hands to the designated items have extended their hands to the item 920 other than the designated items.

The operation of the image display system 1 will now be described with reference to FIGS. 7 to 9.

Figure 7:
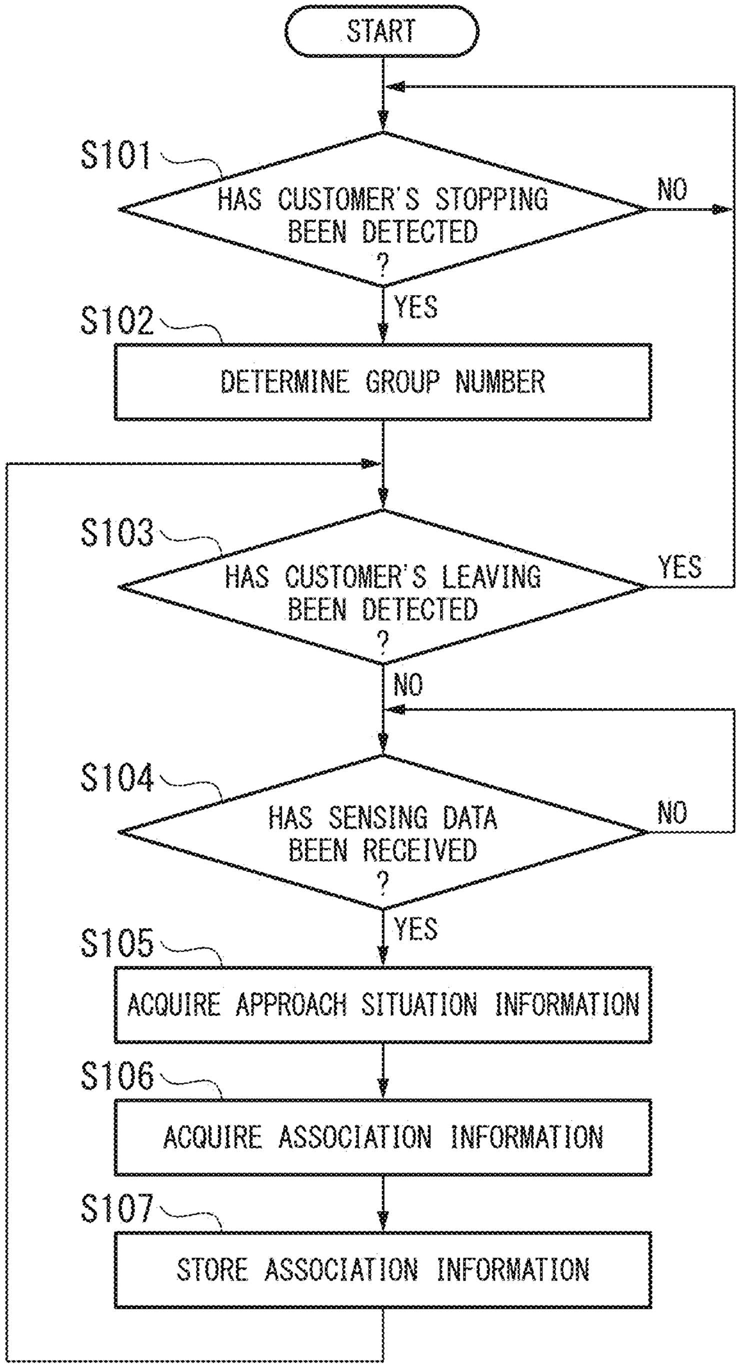
FIG. 7 is a flowchart showing an example of a processing procedure in which the image display device according to the embodiment generates association information.

FIG. 7 is a flowchart showing an example of a processing procedure in which the image display device 200 generates association information. When the image display device enters an operating state as the image display device 200 is connected to a power supply (is powered on), the image display device 200 starts the processing of FIG. 7.

In the processing of FIG. 7, the approach situation information acquirer 291 determines whether or not a customer's stopping in front of the shelves has been detected (step S101). Specifically, upon detecting presence of a customer who has not been in front of the shelves until now in the image captured by the shelf situation imaging device 120, the approach situation information acquirer 291 determines that the customer's stopping in front of the shelves has been detected. When a plurality of customers appeared in the image captured by the shelf situation imaging device 120, the approach situation information acquirer 291 may determine whether or not the customer's stopping has been detected for each of the plurality of customers.

Upon determining that a customer's stopping in front of the shelves has not been detected (step S101: NO), the approach situation information acquirer 291 returns to step S101. That is, the image display device 200 waits for a customer to stop in front of the shelves.

Upon determining in step S101 that a customer's stopping in front of the shelves has been detected (step S101: YES), the approach situation information acquirer 291 determines a group number for the customer's stopping (step S102). For example, an initial value of the group number may be set to 0 and the approach situation information acquirer 291 may add 1 to the group number each time a customer's stopping in front of the shelves is detected.

The approach situation information acquirer 291 determines whether or not the customer's leaving the front of the shelves has been detected (step S103). More specifically, the approach situation information acquirer 291 determines that the customer's leaving the front of the shelves has been detected upon detecting that the customer who has been in front of the shelves is no longer present in the image captured by the shelf situation imaging device 120. When a plurality of customers appeared in the image captured by the shelf situation imaging device 120, the approach situation information acquirer 291 may determine whether or not the customer's leaving has been detected for each of the plurality of customers.

Upon determining that the customer has left the shelf (step S103: YES), the approach situation information acquirer 291 returns to step S101.

Upon determining in step S103 that the customer has not left the shelves (step S103: NO), the approach situation information acquirer 291 determines whether or not sensing data has been acquired from the shelf-front behavior measurement sensor 110 (step S104). Specifically, the approach situation information acquirer 291 determines whether or not the communicator 210 has received sensing data.

Upon determining that sensing data has not been acquired (step S104: NO), the approach situation information acquirer 291 returns to step S104. That is, the image display device 200 waits for sensing data from the shelf-front behavior measurement sensor 110.

Upon determining that sensing data has been acquired in step S104 (step S104: YES), the approach situation information acquirer 291 generates approach situation information (step S105). Specifically, the approach situation information acquirer 291 converts the sensing data received by the communicator 210 into two-dimensional coordinate values on the front face of the shelves 910 and generates approach situation information on the basis of the obtained two-dimensional coordinate values.

The associator 292 generates association information on the basis of the two-dimensional coordinate values obtained in step S105 (step S106). Specifically, the associator 292 generates information that combines the group number determined in step S102, the sensing time, and the item identification information obtained from the two-dimensional coordinate values as association information for one row as in the example of the data structure of FIG. 6.

The associator 292 causes the storage unit 280 to store the association information (the information for one row) obtained in step S106 (step S107).

After step S107, the associator 292 returns to step S103.

Figure 8:
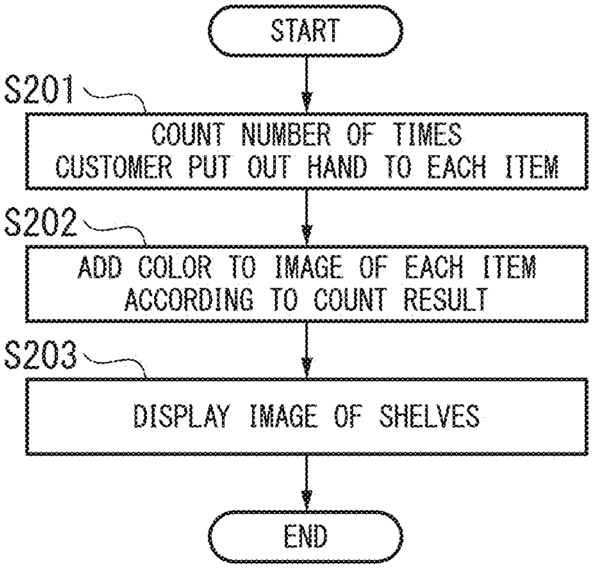
FIG. 8 is a flowchart showing a first example of a processing procedure in which the image display device according to the embodiment displays a customer behavior index value.

FIG. 8 is a flowchart showing a first example of a processing procedure in which the image display device 200 displays a customer behavior index value. FIG. 8 shows an example where, for each item 920, the display unit 220 displays the number of times that customers have extended their hands to the item 920 in a color as described above with reference to FIG. 4. The image display device 200 starts the processing of FIG. 8, for example, when the operation input unit 230 has received a user operation instructing display of a customer behavior index value.

In the processing of FIG. 8, for each item 920, the index value calculator 293 counts the number of times that customers have extended their hands to the item 920 on the basis of the association information obtained in the processing of FIG. 7 (step S201).

On the basis of the count result obtained in step S201, the index value calculator 293 adds colors to the images of the items 920 in the image of the shelves 910 (step S202).

The index value calculator 293 causes the display unit 220 to display the image of the shelves 910 in which colors have been added to the items 920 in step S202 (step S203).

After the step S203, the index value calculator 293 ends the processing of FIG. 8.

Figure 9:
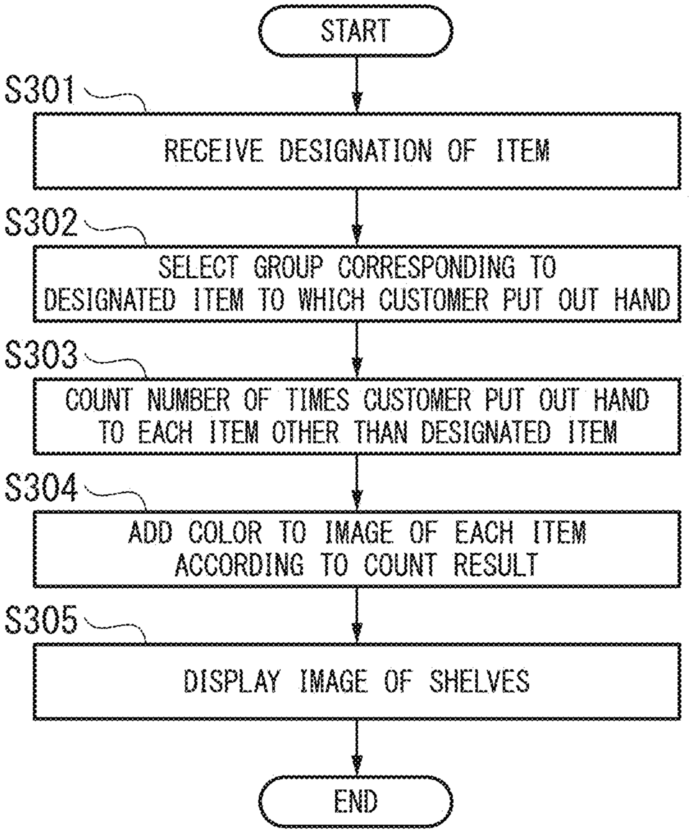
FIG. 9 is a flowchart showing a second example of the processing procedure in which the image display device according to the embodiment displays a customer behavior index value.

FIG. 9 is a flowchart showing a second example of the processing procedure in which the image display device 200 displays a customer behavior index value. FIG. 9 shows an example where, for each item 920 other than a designated item, the display unit 220 displays the number of times that customers who extended their hands to the designated item have extended their hands to the item 920 other than the designated item in a color as described above with reference to FIG. 5. The image display device 200 starts the processing of FIG. 9 when the operation input unit 230 has received a user operation instructing display of a customer behavior index value indicating a correlation between items.

In the processing of FIG. 9, the operation input unit 230 receives designation of an item 920 (step S301). For example, in a state where the display unit 220 displays an image of the shelves 910, the operation input unit 230 receives an operation to designate one of the images of the items 920 included in the image of the shelves 910 with a mouse click. The designation of the item 920 in step S301 is selection of the designated item.

The index value calculator 293 selects all pieces of association information having the same group number as that of association information indicating hand extension to the designated item from among the association information obtained in the processing of FIG. 7 (step S302). That is, the index value calculator 293 acquires association information indicating hand extension performed by customers who extended their hands to the designated item.

For each item 920 other than the designated item, the index value calculator 293 counts the number of times that customers have extended their hands to the item 920 other than the designated item with respect to the association information obtained in step S302 (step S303).

On the basis of the count result obtained in step S303, the index value calculator 293 adds colors to the images of the items 920 other than the designated item in the image of the shelves 910 (step S304).

The index value calculator 293 causes the display unit 220 to display the image of the shelves 910 in which colors have been added to the items 920 in step S304 (step S305).

After the step S305, the index value calculator 293 ends the processing of FIG. 9.

As described above, the approach situation information acquirer 291 acquires approach situation information indicating whether or not at least part of the customer's body has approached the shelves 910 on which the items 920 are displayed and indicating, when at least part thereof has approached the shelves 910, a corresponding position on the shelves 910 at each time. The associator 292 associates the approach situation information with one of the items 920 according to the position indicated by the approach situation information. Thereby, the associator 292 identifies an item 920 to which a customer has extended their hand. The index value calculator 293 calculates an index value relating to the customer's behavior on the basis of information indicating the item 920 associated with the approach situation information. The display unit 220 displays the index value calculated by the index value calculator 293 at the position of the image of the item 920 in the image of the shelves 910 on the basis of the association made by the associator 292.

As a result, the image display system 1 can display information indicating the customer's behavior in more detail. In particular, the image display system 1 can display information indicating the customer's behavior for each item in more detail than that for each display shelf. By referring to this display, the user can perform more sophisticated analysis of customers' behavior.

The operation input unit 230 receives designation of an item by a user operation. The index value calculator 293 calculates an index value indicating the correlation between behaviors that the same customer has performed for a designated item and items other than the designated item.

As a result, the display unit 220 can visually display the correlation between items. This allows the user to analyze the correlation between items by referring to this display.

The user can determine to where on the shelves customers have extended their hands using the image display system 1. This allows the user to determine to where on the shelves customers can easily extend their hands.

In addition, by using the image display system 1, the user can acquire information such as that regarding which items customers have extended their hands to and that regarding which items customers have compared with each other. The user can use such information for marketing individual items.

The display unit 220 may display the number of times that customers have picked up each item in addition to or instead of displaying the number of times that customers have extended their hands to each item described above with reference to FIGS. 4 and 5. For example, the image display system 1 may include a camera that captures images from the top of the shelves 910 downward and the index value calculator 293 may analyze the images of this camera to determine whether or not a customer has picked up an item.

The display unit 220 may display information regarding whether or not an item purchase has been made such as determination as to whether a customer has purchased an item or returned the item to the shelves. For example, the index value calculator 293 compares an image captured by the shelf situation imaging device 120 before a customer stops in front of the shelves and an image captured by the shelf situation imaging device 120 after the customer has left the shelves. The index value calculator 293 determines that the customer has purchased the item upon detecting that the number of items has decreased. The index value calculator 293 determines that an item that the customer picked up has returned to the shelves upon detecting that the number of items has not decreased.

The display unit 220 may display a period of time during which a customer picked up an item. For example, the display unit 220 may display an average period of time per pickup of an item by a customer, using each of a period of time from when the customer picks up the item to when returning the item and a period of time from when the customer picks up the item to when leaving the shelf as the period of time during which the customer picked up the item.

As a result, the user can determine whether each individual item is one which the customer has purchased after careful consideration or one which the customer has decided in advance to purchase, and the user can use such information for reference in marketing of items.

The image display system 1 may calculate a period of time during which the customer stays in front of the shelves and display the calculated period of time together with the display of the shelf-front behavior index value described above.

The image display system 1 may include a camera for imaging a customer in front of the shelves from the side of the shelves and acquire information of at least one of the orientation of the face of the customer and the direction of the line of sight of the customer and display the acquired information together with the display of the shelf-front behavior index value described above.

The image display system 1 may display information other than the shelf-front behavior information together with the display of the shelf-front behavior index value described above. For example, the storage unit 280 may previously store information indicating whether each customer is a member or not and the image display system 1 may extract and display information such as information indicating that people who are members are likely to pick up the item as the shelf-front behavior index value.

A minimal configuration of the present invention will be described below with reference to FIGS. 10 and 11.

Figure 10:
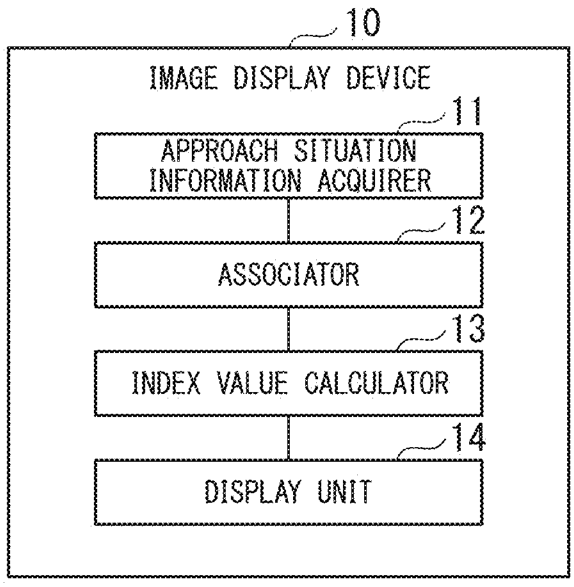
FIG. 10 is an explanatory diagram showing a minimal configuration of the image display device according to the present invention.

FIG. 10 is an explanatory diagram showing a minimal configuration of the image display device according to the present invention. The image display device 10 shown in FIG. 10 includes an approach situation information acquirer 11, an associator 12, an index value calculator 13 and a display unit 14.

In this configuration, the approach situation information acquirer 11 acquires approach situation information indicating approach of at least part of the customer's body to shelves on which items are displayed and indicating, when there is the approach, a position of the approach on the shelves at each time. The associator 12 associates the approach situation information with one of the items according to the position indicated by the approach situation information. The index value calculator 13 calculates an index value relating to the customer's behavior on the basis of information indicating the item associated with the approach situation information. The display unit 14 displays the index value calculated by the index value calculator 13 at the position of the image of the item in the image of the shelves on the basis of the association made by the associator 12.

As a result, the image display device 10 can display information indicating the customer's behavior in more detail. In particular, the image display device 10 can display information indicating the customer's behavior for each item in more detail than that for each display shelf. By referring to this display, the user can perform more sophisticated analysis of customers' behavior.

Figure 11:
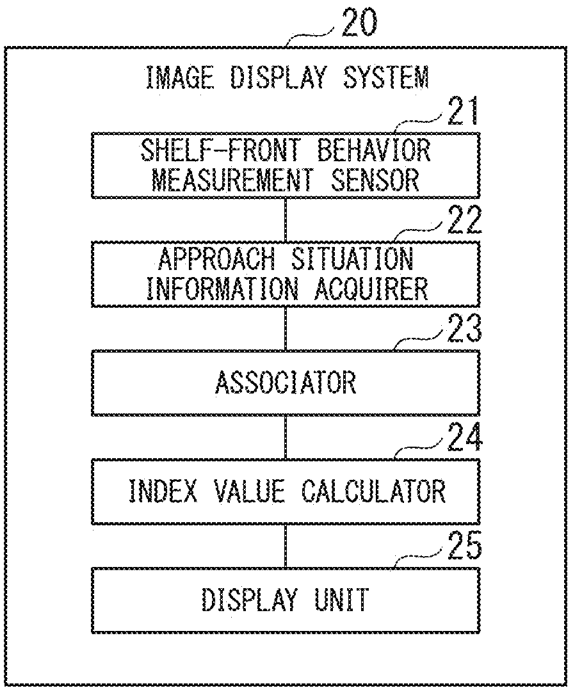
FIG. 11 is an explanatory diagram showing a minimal configuration of the image display system according to the present invention.

FIG. 11 is an explanatory diagram showing a minimal configuration of the image display system according to the present invention. The image display system 20 shown in FIG. 11 includes a shelf-front behavior measurement sensor 21, an approach situation information acquirer 22, an associator 23, an index value calculator 24 and a display unit 25.

In this configuration, the shelf-front behavior measurement sensor 21 detects approach of at least part of the customer's body to a shelf on which items are displayed and generates sensing data indicating the position of an approached portion on the shelves. On the basis of the sensing data, the approach situation information acquirer 22 generates approach situation information indicating whether or not there is the approach and indicating, when there is the approach, the position on the shelves at each time. The associator 23 associates the approach situation information with one of the items according to the position indicated by the approach situation information. The index value calculator 24 calculates an index value relating to the customer's behavior on the basis of information indicating the item associated with the approach situation information. The display unit 25 displays the index value calculated by the index value calculator 24 at the position of the image of the item in the image of the shelves on the basis of the association made by the associator 23.

As a result, the image display system 20 can display information indicating the customer's behavior in more detail. In particular, the image display system 20 can display information indicating the customer's behavior for each item in more detail than that for each display shelf. By referring to this display, the user can perform more sophisticated analysis of customers' behavior.

A program for realizing some or all of the functions of the controller 290, the approach situation information acquirer 11, the associator 12, the index value calculator 13, the approach situation information acquirer 22, the associator 23, and the index value calculator 24 may be recorded on a computer-readable recording medium, and processing of each of the components may be performed by causing a computer system to read and execute the program recorded on the recording medium. The "computer system" referred to here includes an OS and hardware such as peripheral devices.

The "computer-readable recording medium" refers to a flexible disk, a magneto-optical disc, a ROM, a portable medium such as a CD-ROM, or a storage device such as a hard disk provided in the computer system. Further, the program described above may be one for realizing some of the functions described above and may also be one for realizing the functions described above in combination with a program already recorded on the computer system.

Although the embodiments of the present invention has been described in detail with reference to the drawings, the specific configuration is not limited to the embodiments and includes design changes or the like without departing from the spirit of the present invention.

Priority is claimed on Japanese Patent Application No. 2016-057537, filed on Mar. 22, 2016, the content of which is incorporated herein by reference.

INDUSTRIAL APPLICABILITY

The present invention can be applied to an application in which it is indispensable to display information indicating a customer's behavior in more detail.

REFERENCE SIGNS LIST

1, 20 Image display system
10, 200 Image display device
11, 22, 291 Approach situation information acquirer
12, 23, 292 Associator
13, 24, 293 Index value calculator
14, 25, 220 Display unit
21, 110 Shelf-front behavior measurement sensor
120 Shelf situation imaging device
210 Communicator
230 Operation input unit
280 Storage unit
290 Controller

The invention claimed is:

1. An information processing device comprising:
at least one memory configured to store instructions; and
at least one processor configured to execute the instructions to:
count a first number of times that a customer picks up a first product displayed on a shelf;
calculate an average period of time between when the customer picks up the first product from the shelf and when the customer return the first product to the shelf;
generate an image including an image of the first product displayed on the shelf and an index value based on the first number of times that the customer picks up the first product displayed on the shelf, wherein the index value is displayed at a first position of the image of the first product; and
control a display to display the image and the average period of time.

2. The information processing device according to claim 1, wherein the image indicates the index value by being superimposed with a first color on the first position of the image of the first product, which is selected from among a plurality of colors which are set to a heat map in advance such that the predetermined color is changeable according to the first number of times.

3. The information processing device according to claim 2, wherein the at least one processor is further configured to execute the instructions to:
count a second number of times that the customer picks up a second product among the plurality of products displayed on the shelf; and
generate the image by adding a second color corresponding to the second number of times to a second position of the image including the second product.

4. The information processing device according to claim 3, wherein at least one of the first image and the second image includes a legend indicating an association between the number of times and the color.

5. The information processing device according to claim 1, wherein the at least one processor is further configured to execute the instructions to:
determine a distance between a customer's hand and a sensor configured to detect the first position to which the customer picked up the first product.

6. The information processing device according to claim 5, wherein the at least one processor is further configured to execute the instructions to estimate the first product based on the distance.

7. The information processing device according to claim 5, wherein the at least one processor is further configured to execute the instructions to determine a position of the customer's hand in front of the shelf.

8. The information processing device according to claim 4, wherein the at least one processor is further configured to execute the instructions to generate the at least one of the first image and the second image as including a highlighting of at least one of the first product and the second product, and
wherein the highlighting comprises at least one of stripped and dotted lines superimposed over the at least one of the first product and the second product.

9. An information processing method comprising:
counting a first number of times that a customer picks up a first product displayed on a shelf;
calculating an average period of time between when the customer picks up the first product from the shelf and when the customer return the first product to the shelf;
generating an image including an image of the first product displayed on the shelf and an index value based on the first number of times that the customer picks up the first product displayed on the shelf, wherein the index value is displayed at a position of the image of the first product; and
controlling a display to display the image and the average period of time.

10. The information processing method according to claim 9, wherein the image indicates the index value by being superimposed with a first color on the first position of the image of the first product, which is selected from among a plurality of colors which are set to a heat map in advance such that the predetermined color is changeable according to the first number of times.

11. The information processing method according to claim 10 further comprising:
counting a second number of times that the customer picks up a second product among the plurality of products displayed on the shelf, and
generating the image by adding a second color corresponding to the second number of times to a second position of the image including the second product.

12. The information processing method according to claim 11, wherein at least one of the first image and the second image includes a legend indicating an association between the number of times and the color.

13. The information processing method according to claim 9 further comprising
determining a distance between a customer's hand and a sensor configured to detect the first position to which the customer picked up the first product.

14. The information processing device according to claim 13 further comprising
estimating the first product based on the distance.

15. The information processing device according to claim 13 further comprising
determining a position of the customer's hand in front of the shelf.

16. The information processing device according to claim 12 further comprising generating the at least one of the first image and the second image as including a highlighting of at least one of the first product and the second product, and wherein the highlighting comprises at least one of stripped and dotted lines superimposed over the at least one of the first product and the second product.

17. A non-transitory storage medium storing a program for causing a computer of an information processing device to execute:

counting a first number of times that a customer picks up a first product displayed on a shelf;

calculating an average period of time between when the customer picks up the first product from the shelf and when the customer return the first product to the shelf;

generating an image including an image of the first product displayed on the shelf and an index value based on the first number of times that the customer picks up the first product displayed on the shelf, wherein the index value is displayed at a first position of the image of the first product; and controlling a display to display the image and the average period of time.

* * * * *